May 10, 1932. A. POULSEN ET AL 1,857,569
DEVICE FOR RECORDING OF SOUND
Filed Dec. 4, 1929
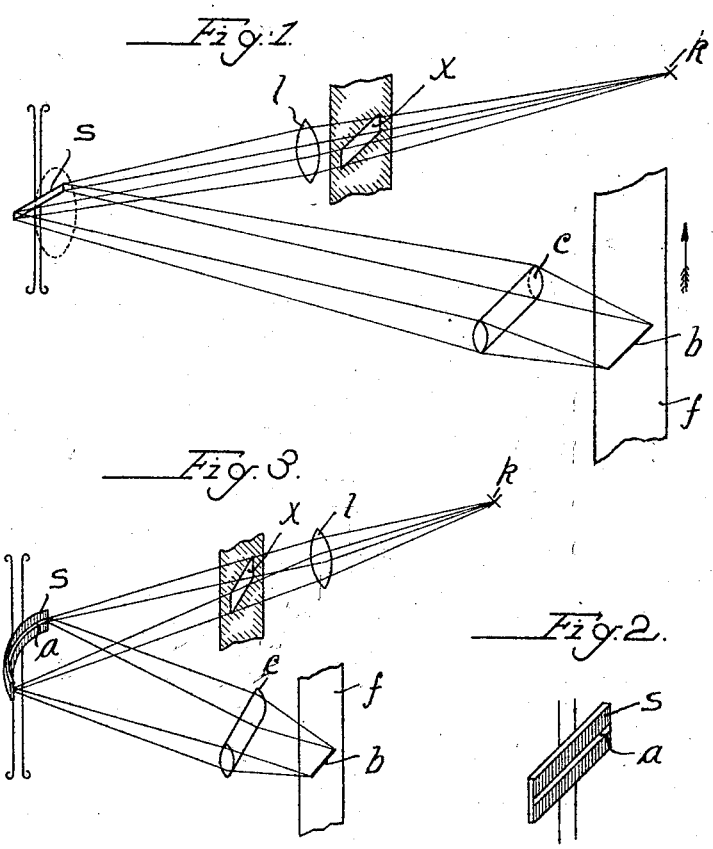
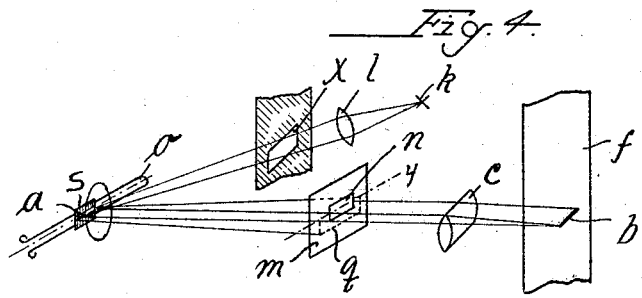
INVENTORS
ARNOLD POULSEN
A.C.G. PETERSEN
by Emil Bonnelycke, Atty.

Patented May 10, 1932

1,857,569

UNITED STATES PATENT OFFICE

ARNOLD POULSEN, OF HELLERUP, AND AXEL CARL GEORG PETERSEN, OF COPENHAGEN, DENMARK

DEVICE FOR RECORDING OF SOUND

Application filed December 4, 1929, Serial No. 411,574, and in Denmark December 22, 1928.

It is commonly known to record sound on a light-sensitive film, for instance a photographic film, by causing a mirror to project a pencil of light on to the film where the said pencil is condensed and forms a linear stripe of light, the length or intensity of which is varied in accordance with the sound oscillations.

The varying illumination of the photographic film has been effected by causing the light reflected from the mirror to oscillate across a slit through which the film is exposed to the light. In order to attain a sharp and accurate record of the sound on the photographic film it is necessary, however, that the portion of the film exposed at any moment should be reduced to a very narrow stripe, the width of which, in the direction of the motion of the film, should not exceed the width of a half-wave of the highest frequency occurring in the sound record. This requirement has been filled by inserting the said very narrow slit directly in front of the film, or by inserting the slit at some other suitable point of the path of the rays of light, and by forming then an image of the slit in the plane of the film by means of lenses forming, if desired, a reduced image of the slit.

This use of a slit, however, involves the drawback that aberration phenomena will occur in the path of the rays of light, and for this reason it has been proposed to use, instead of a narrow slit, a punctual or linear source of light and to form an image thereof in the plane of the film by means of a cylinder lens condensing the rays of light reflected from the mirror so as to form a linear image on the film. The linear source of light may in this case be a part of an incandescent wire.

The last mentioned process, however, suffers from the drawback that an incandescent wire of the required minute thickness has but a very short life, if it has to be of a suitably high temperature enabling it to emit a suitable amount of light. Because the mirror, as a rule, has to be of very small dimensions in order that its mass shall not appreciably influence its oscillations, and because the incandescent wire must not be exposed to any especially high temperature, only a relatively small quantity of light will be available for lighting the film. A further drawback is that the lens which condenses the light emitted from the source of light, and directs the said light towards the mirror and, consequently, assists in the formation of the image, must be an accurately corrected lens having, therefore a relatively small aperture, whereby again the quantity of light will be reduced.

According to the present invention the said difficulties are avoided in that the linear member of the recording device is formed by the mirror itself or rather by the reflecting surface thereof, as illustrated by the drawings.

Fig. 1 shows in outline a recording device constructed according to the present invention.

Fig. 2 shows another form of mirror which can be used in our device.

Figs. 3 and 4 show, in perspective view, two different constructions of a mirror according to the present invention.

As it appears from Fig. 1, where $f$ is a film on to which the sound oscillations are to be recorded by means of a mirror $s$, which is caused to oscillate in accordance with the sound oscillations and projects light from a source of light $k$ on to the film $f$, there is used according to the invention a mirror the width of which, in the direction of motion of the film as indicated by the arrow in Fig. 1, is so small relatively to the length of the mirror in the direction across the film that the mirror will mainly be linear. The word "mirror" means in this connection the part of the reflecting surface of the mirror that is active in reflecting the rays of light from the source of light $k$. In general it will be very difficult to produce a mirror which in itself is as narrow as desired, but a narrow reflecting surface may be procured on a broader mirror by screening or blackening or coating so large a portion of the mirror surface that only a very narrow linear mirror band $a$, Fig. 2, in direction across the film will be active in respect to reflection.

By the system shown, in contradistinction to the heretofore used systems, an image is formed on the surface of the film, of the mirror itself, but not of an image of the source of light formed by the mirror, and therefore the lens $l$, Fig. 1, serving to concentrate the light on to the mirror does not have to be a corrected lens, but may be an ordinary condenser lens of large diameter. Thereby it becomes practicable to concentrate much light on to the mirror. The formation on the film of the image $b$ of the mirror is effected in known manner by means of a cylinder lens $c$.

In order to attain a sharp image of the reflecting portion of the mirror the reflecting coating of the mirror, which may be for instance a mince layer of silver, is suitably applied to the front face of the mirror, and in order to prevent the layer of silver from tarnishing it may be desirable to immerse the mirror in oil.

As is well known, the image formed by a cylinder lens will be sharply defined only on two sides. In the present case the stripe of light $b$ will thus only be sharply defined in the longitudinal direction of the film, while the cylinder lens will be unable to define the image $b$ sharply in the direction across the film. A sharp definition of the image $b$ in the longitudinal direction of the same is, however, of importance to the purity of the sound when reproduced, and may be attained by inserting in the path of the rays, for instance in front of the lens $l$, a stop $x$ which is depicted sharply in the plane of the film and, thereby, gives the required longitudinal definition of the image $b$. If, however, the mirror is concave or cylindrical it has the property of concentrating the rays, and the stop $x$ may be omitted. In general it will be difficult to construct a mirror with the here used small dimensions as a concave mirror adapted to form on the film a sharply defined image of the stop, and therefore the formation of such an image will generally require a suitable lens to be inserted in front of the mirror. The use of such a lens may be avoided, however, according to the present invention by shaping the mirror as a cylindrical mirror, Fig. 3, the axis of which is parallel to the direction of motion of the film and, therefore, perpendicular to the major dimension of the mirror. Owing to its very small extent in the axial direction the reflecting surface will in fact act essentially as a concave mirror, and it will therefore form in the plane of the film a sharp image of the vertical edges of the stop $x$.

Fig. 4 illustrates an ordinary recording by way of intensity variations. $s$ is the mirror in an oscillograph which mirror in known manner is caused to oscillate about an axis $o$ parallel to the face of the film $f$ and vertical to the direction of movement of same. The light from a source of light $k$ is concentrated on the mirror $s$ by way of a lens $l$, which forms an image $a$ of the linear light source on the front face of the mirror $s$. The light rays reflected from the mirror $s$ form an image $q$ of the slit $x$ in front of the lens $l$ on a screen $m$ which is provided with a slit $n$. The screen $m$ is adjusted to such position relatively to the mirror $s$ that the image $q$ partially appears across the slit $n$, for instance the upper edge of the image appears in the line $y$ which divides the slit $n$ longitudinally in two equal parts. The cylindrical lens $c$ forms on the film $f$ by way of the light rays passing the slit $n$ an image $b$ which image is a reconstruction of the image of the light source $k$ formed on the mirror.

It would be obvious that when the mirror in known manner is caused to oscillate about the axis $o$ in accordance with the sound variations, the amount of light which passes the slit $n$ will vary and consequently the intensity of the image $b$ formed on the film $f$ will vary to the same degree, i. e., proportionately to the oscillations of the mirror and consequently in accordance with the sound amplitudes which cause the mirror to oscillate. In order to secure a distinct image $q$ a lens may be arranged in front of the mirror $s$.

The light source $k$ in Fig. 4 is linear. If, however, the present invention is applied to the arrangement according to Fig. 4, the ordinary mirror $s$ is replaced by a mirror of the kind referred to above and shown in Figs. 2 or 3. Then the strip $a$ (Fig. 4) represents not an image of the light source, but a linear reflecting surface, and the light source $k$ need not be linear.

Having now particularly described and ascertained the nature of our said invention and in what manner the same is to be performed, we declare that what we claim is:—

1. A system for recording sounds on a movable film, comprising a light source, a sound controlled oscillatable reflecting surface of linear dimensions, arranged to reflect a beam of light from the said light source towards the film, and an optical system arranged to form on the film an image of the reflecting surface.

2. A system for recording sounds on a movable film, comprising a light source, a sound controlled oscillatable reflecting surface of linear dimensions, arranged to reflect a beam of light from the said light source towards the film, an optical system arranged to form on the film an image of the reflecting surface, and means for sharply defining the image formed on the film.

In testimony whereof we affix our signatures.

ARNOLD POULSEN.
AXEL CARL GEORG PETERSEN.